(12) United States Patent
Elomari

(10) Patent No.: US 7,226,569 B2
(45) Date of Patent: Jun. 5, 2007

(54) REDUCTION OF OXIDES OF NITROGEN IN A GAS STREAM USING MOLECULAR SIEVE SSZ-56

(75) Inventor: Saleh Elomari, Fairfield, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 11/454,477

(22) Filed: Jun. 16, 2006

(65) Prior Publication Data

US 2006/0292052 A1 Dec. 28, 2006

Related U.S. Application Data

(60) Provisional application No. 60/694,030, filed on Jun. 23, 2005.

(51) Int. Cl.
*C01B 21/20* (2006.01)

(52) U.S. Cl. ................ 423/213.2; 423/213.5; 423/239.2

(58) Field of Classification Search ............. 423/213.2, 423/213.5, 239.2
See application file for complete search history.

(56) References Cited

U.S. PATENT DOCUMENTS

| | | | | |
|---|---|---|---|---|
| 3,010,789 | A * | 11/1961 | Milton ................ | 423/718 |
| 4,826,667 | A * | 5/1989 | Zones et al. .......... | 423/706 |
| 6,049,018 | A * | 4/2000 | Calabro et al. ........ | 585/446 |
| 6,080,382 | A * | 6/2000 | Lee et al. ............. | 423/706 |
| 6,464,956 | B1 * | 10/2002 | Elomari ............... | 423/706 |
| 6,632,416 | B2 * | 10/2003 | Elomari ............... | 423/706 |
| 6,942,847 | B2 * | 9/2005 | Harbuzaru et al. .... | 423/718 |
| 7,074,385 | B2 * | 7/2006 | Harbuzaru et al. .... | 423/718 |

* cited by examiner

*Primary Examiner*—David Sample
(74) *Attorney, Agent, or Firm*—Richard J. Sheridan

(57) ABSTRACT

The present invention relates to new crystalline molecular sieve SSZ-56 prepared using a N,N-diethyl-2-methyl-decahydroquinolinium cation as a structure-directing agent, methods for synthesizing SSZ-56 and processes employing SSZ-56 in a catalyst.

12 Claims, No Drawings

REDUCTION OF OXIDES OF NITROGEN IN A GAS STREAM USING MOLECULAR SIEVE SSZ-56

This application claims the benefit of U.S. Provisional Application Ser. No. 60/694,030, filed Jun. 23, 2005.

BACKGROUND OF THE INVENTION

1. Field of the Invention

The present invention relates to new crystalline molecular sieve SSZ-56, a method for preparing SSZ-56 using a N,N-diethyl-2-methyldecahydroquinolinium cation as a structure directing agent and the use of SSZ-56 in catalysts for the reduction of oxides of nitrogen in a gas stream.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

SUMMARY OF THE INVENTION

The present invention is directed to a family of crystalline molecular sieves with unique properties, referred to herein as "molecular sieve SSZ-56" or simply "SSZ-56". Preferably, SSZ-56 is in its silicate, aluminosilicate, titanosilicate, vanadosilicate or borosilicate form. The term "silicate" refers to a molecular sieve having a high mole ratio of silicon oxide relative to aluminum oxide, preferably a mole ratio greater than 100, including molecular sieves comprised entirely of silicon oxide. As used herein, the term "aluminosilicate" refers to a molecular sieve containing both aluminum oxide and silicon oxide and the term "borosilicate" refers to a molecular sieve containing oxides of both boron and silicon.

In accordance with this invention, there is provided a process for the reduction of oxides of nitrogen contained in a gas stream wherein said process comprises contacting the gas stream with a molecular sieve, the molecular sieve having a mole ratio greater than about 15 of (1) an oxide of a first tetravalent element to (2) an oxide of a trivalent element, pentavalent element, second tetravalent element different from said first tetravalent element or mixture thereof and having, after calcination, the X-ray diffraction lines of Table 2. There is also provided a process for the reduction of oxides of nitrogen contained in a gas stream wherein said process comprises contacting the gas stream with a molecular sieve, the molecular sieve having a mole ratio greater than about 15 of (1) silicon oxide to (2) an oxide selected from aluminum oxide, gallium oxide, iron oxide, boron oxide, titanium oxide, indium oxide and mixtures thereof, and having, after calcination, the X-ray diffraction lines of Table 2. The molecular sieve may contain a metal or metal ions (such as cobalt, copper, platinum, iron, chromium, manganese, nickel, zinc, lanthanum, palladium, rhodium or mixtures thereof) capable of catalyzing the reduction of the oxides of nitrogen, and the process may be conducted in the presence of a stoichiometric excess of oxygen. In a preferred embodiment, the gas stream is the exhaust stream of an internal combustion engine.

DETAILED DESCRIPTION OF THE INVENTION

The present invention comprises a family of crystalline molecular sieves designated herein "molecular sieve SSZ-56" or simply "SSZ-56". In preparing SSZ-56, a N,N-diethyl-2-methyldecahydroquinolinium cation (the trans-fused ring isomer) is used as a structure directing agent ("SDA"), also known as a crystallization template. The SDA useful for making SSZ-56 has the following structure:

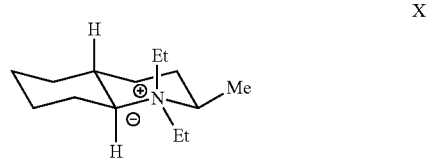

The SDA cation is associated with an anion ($X^-$) which may be any anion that is not detrimental to the formation of the molecular sieve. Representative anions include halogen, e.g., fluoride, chloride, bromide and iodide, hydroxide, acetate, sulfate, tetrafluoroborate, carboxylate, and the like. Hydroxide is the most preferred anion.

SSZ-56 is prepared from a reaction mixture having the composition shown in Table A below.

TABLE A

| | Reaction Mixture | |
|---|---|---|
| | Typical | Preferred |
| $YO_2/W_aO_b$ | ≧15 | 30–60 |
| $OH^-/YO_2$ | 0.10–0.50 | 0.20–0.30 |
| $Q/YO_2$ | 0.05–0.50 | 0.10–0.30 |
| $M_{2/n}/YO_2$ | 0–0.40 | 0.10–0.25 |
| $H_2O/YO_2$ | 20–80 | 30–45 | where Y is silicon; W is aluminum, gallium, iron, boron, titanium, indium, vanadium or mixtures thereof; a is 1 or 2, b is 2 when a is 1 (i.e., W is tetravalent); b is 3 when a is 2 (i.e., W is trivalent); M is an alkali metal cation, alkaline earth metal cation or mixtures thereof; n is the valence of M (i.e., 1 or 2); and Q is a trans-fused ring N,N-diethyl-2-methyldecahydroquinolinium cation;.

In practice, SSZ-56 is prepared by a process comprising:
(a) preparing an aqueous solution containing sources of oxides capable of forming a crystalline molecular sieve and a trans-fused ring N,N-diethyl-2-methyldecahydroquinolinium cation having an anionic counterion which is not detrimental to the formation of SSZ-56;
(b) maintaining the aqueous solution under conditions sufficient to form crystals of SSZ-56; and
(c) recovering the crystals of SSZ-56.

Accordingly, SSZ-56 may comprise the crystalline material and the SDA in combination with metallic and non-metallic oxides bonded in tetrahedral coordination through shared oxygen atoms to form a cross-linked three dimensional crystal structure. Typical sources of silicon oxide include silicates, silica hydrogel, silicic acid, fumed silica, colloidal silica, tetra-alkyl orthosilicates, and silica hydroxides. Boron can be added in forms corresponding to its silicon counterpart, such as boric acid.

A source zeolite reagent may provide a source of boron. In most cases, the source zeolite also provides a source of silica. The source zeolite in its deboronated form may also be used as a source of silica, with additional silicon added using, for example, the conventional sources listed above. Use of a source zeolite reagent for the present process is more completely described in U.S. Pat. No. 5,225,179, issued Jul. 6, 1993 to Nakagawa entitled "Method of Making Molecular Sieves", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The SDA may be used to provide hydroxide ion. Thus, it may be beneficial to ion exchange, for example, the halide to hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-56 are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days.

Preferably, the molecular sieve is prepared using mild stirring or agitation.

During the hydrothermal crystallization step, the SSZ-56 crystals can be allowed to nucleate spontaneously from the reaction mixture. The use of SSZ-56 crystals as seed material can be advantageous in decreasing the time necessary for complete crystallization to occur. In addition, seeding can lead to an increased purity of the product obtained by promoting the nucleation and/or formation of SSZ-56 over any undesired phases. When used as seeds, SSZ-56 crystals are added in an amount between 0.1 and 10% of the weight of first tetravalent element oxide, e.g. silica, used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-56 crystals. The drying step can be performed at atmospheric pressure or under vacuum.

SSZ-56 as prepared has a mole ratio of silicon oxide to boron oxide greater than about 15; and has, after calcination, the X-ray diffraction lines of Table 2 below. SSZ-56 further has a composition, as synthesized (i.e., prior to removal of the SDA from the SSZ-56) and in the anhydrous state, in terms of mole ratios, shown in Table B below.

TABLE B

| As-Synthesized SSZ-56 | |
|---|---|
| $YO_2/W_cO_d$ | 15–infinity |
| $M_{2/n}/YO_2$ | 0–0.03 |
| $Q/YO_2$ | 0.02–0.05 | where Y, W, M, n, and Q are as defined above and c is 1 or 2; d is 2 when c is 1 (i.e., W is tetravalent) or d is 3 or 5 when c is 2 (i.e., d is 3 when W is trivalent or 5 when W is pentavalent).

SSZ-56 can be an all-silica. SSZ-56 is made as a borosilicate and then the boron can be removed, if desired, by treating the borosilicate SSZ-56 with acetic acid at elevated temperature (as described in Jones et al., Chem. Mater., 2001, 13, 1041–1050) to produce an all-silica version of SSZ-56 (i.e., $YO_2/W_cO_d$ is $\infty$).

If desired, SSZ-56 can be made as a borosilicate and then the boron can be removed as described above and replaced with metal atoms by techniques known in the art. Aluminum, gallium, iron, titanium, vanadium and mixtures thereof can be added in this manner.

It is believed that SSZ-56 is comprised of a new framework structure or topology which is characterized by its X-ray diffraction pattern. SSZ-56, as-synthesized, has a crystalline structure whose X-ray powder diffraction pattern exhibit the characteristic lines shown in Table 1 and is thereby distinguished from other molecular sieves.

TABLE 1

X-ray data for the as-synthesized Boron-SSZ-56

| $2\theta^{(a)}$ | d | Relative Intensity$^{(b)}$ |
|---|---|---|
| 6.58 | 13.43 | M |
| 7.43 | 11.88 | M |
| 7.93 | 11.14 | S |
| 8.41 | 10.51 | M |
| 13.22 | 6.69 | M |
| 13.93 | 5.95 | M |
| 14.86 | 5.95 | M |
| 22.59 | 3.93 | VS |
| 23.26 | 3.82 | VS |
| 24.03 | 3.70 | S |

$^{(a)}$±0.10
$^{(b)}$The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

Table 1A below shows the X-ray powder diffraction lines for as-synthesized SSZ-56 including actual relative intensities.

TABLE 1A

As-Synthesized SSZ-56

| $2\theta^{(a)}$ | d | $I/I_o \times 100$ Relative Intensity |
|---|---|---|
| 6.58 | 13.42 | 36.3 |
| 7.43 | 11.88 | 25.2 |
| 7.93 | 11.14 | 58.5 |
| 8.41 | 10.51 | 30.9 |
| 8.84 | 10.00 | 18.0 |
| 9.5 | 9.30 | 4.9 |
| 11.04 | 8.00 | 11.1 |
| 11.29 | 7.83 | 4.5 |

TABLE 1A-continued

As-Synthesized SSZ-56

| 2θ[(a)] | d | I/Io × 100 Relative Intensity |
|---|---|---|
| 11.56 | 7.64 | 12.6 |
| 12.15 | 7.27 | 18.7 |
| 13.22 | 6.70 | 34.3 |
| 13.93 | 6.35 | 21.6 |
| 14.86 | 5.96 | 20.4 |
| 15.94 | 5.56 | 5.7 |
| 17.02 | 5.20 | 10.8 |
| 17.45 | 5.07 | 8.2 |
| 17.77 | 4.99 | 5.8 |
| 18.04 | 4.91 | 13.6 |
| 18.79 | 4.72 | 8.4 |
| 19.72 | 4.50 | 2.1 |
| 19.90 | 4.46 | 2.2 |
| 20.11 | 4.41 | 4.4 |
| 20.42 | 4.35 | 8.8 |
| 21.22 | 4.18 | 19.8 |
| 21.57 | 4.12 | 3.2 |
| 22.58 | 3.93 | 73.1 |
| 23.26 | 3.82 | 100.0 |
| 24.03 | 3.70 | 48.9 |
| 25.04 | 3.55 | 5.7 |
| 25.32 | 3.51 | 4.1 |
| 25.49 | 3.49 | 3.5 |
| 25.99 | 3.42 | 12.9 |
| 26.58 | 3.35 | 10.2 |
| 26.86 | 3.32 | 7.2 |
| 28.33 | 3.15 | 6.6 |
| 28.86 | 3.09 | 13.3 |
| 29.41 | 3.03 | 3.5 |
| 29.68 | 3.00 | 5.1 |
| 30.07 | 2.97 | 9.4 |
| 31.07 | 2.88 | 2.2 |
| 32.08 | 2.79 | 5.9 |
| 32.82 | 2.73 | 2.7 |
| 34.13 | 2.62 | 4.9 |
| 34.97 | 2.56 | 3.4 |
| 37.49 | 2.39 | 2.9 |

[(a)]±0.10

After calcination, the SSZ-56 molecular sieves have a crystalline structure whose X-ray powder diffraction pattern include the characteristic lines shown in Table 2:

TABLE 2

X-ray data for calcined SSZ-56

| 2θ | d | Relative Intensity |
|---|---|---|
| 6.54 | 13.51 | VS |
| 7.36 | 11.97 | VS |
| 7.89 | 11.20 | VS |
| 8.35 | 10.58 | VS |
| 8.81 | 10.03 | S |
| 13.16 | 6.72 | M |
| 14.83 | 5.96 | M |
| 22.48 | 3.95 | VS |
| 23.24 | 3.82 | VS |
| 23.99 | 3.70 | S |

[(a)]±0.10

Table 2A below shows the X-ray powder diffraction lines for calcined SSZ-56 including actual relative intensities.

TABLE 2A

Calcined SSZ-56

| 2θ[(a)] | d | I/Io × 100 Relative Intensity |
|---|---|---|
| 6.54 | 13.51 | 70.0 |
| 7.38 | 11.97 | 69.3 |
| 7.89 | 11.20 | 85.2 |
| 8.35 | 10.58 | 68.7 |
| 8.81 | 10.03 | 43.2 |
| 11.23 | 7.87 | 14.7 |
| 11.52 | 7.68 | 5.6 |
| 12.09 | 7.31 | 9.9 |
| 13.16 | 6.72 | 23.3 |
| 13.89 | 6.37 | 11.1 |
| 14.42 | 6.14 | 9.3 |
| 14.83 | 5.97 | 38.5 |
| 15.89 | 5.57 | 8.1 |
| 16.95 | 5.22 | 6.0 |
| 17.41 | 5.09 | 5.4 |
| 17.75 | 5.00 | 6.7 |
| 17.96 | 4.93 | 6.3 |
| 18.75 | 4.73 | 7.7 |
| 19.05 | 4.66 | 3.3 |
| 20.00 | 4.44 | 7.5 |
| 20.36 | 4.36 | 5.0 |
| 21.15 | 4.19 | 16.9 |
| 21.55 | 4.12 | 4.5 |
| 22.48 | 3.95 | 63.0 |
| 23.24 | 3.82 | 100.0 |
| 23.99 | 3.71 | 44.8 |
| 25.15 | 3.54 | 4.4 |
| 25.41 | 3.50 | 2.6 |
| 25.96 | 3.43 | 15.6 |
| 26.51 | 3.36 | 10.2 |
| 26.83 | 3.32 | 6.5 |
| 28.19 | 3.16 | 10.6 |
| 28.80 | 3.10 | 15.7 |
| 29.28 | 3.05 | 2.7 |
| 30.02 | 2.97 | 11.3 |
| 30.98 | 2.88 | 3.0 |
| 31.99 | 2.80 | 5.5 |
| 32.72 | 2.73 | 4.3 |
| 34.04 | 2.63 | 5.9 |
| 34.42 | 2.60 | 2.6 |
| 34.70 | 2.58 | 4.1 |
| 35.34 | 2.54 | 2.1 |
| 36.05 | 2.49 | 2.7 |
| 37.41 | 2.40 | 2.8 |
| 39.76 | 2.26 | 1.8 |

[(a)]±0.10

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.10 degrees.

The X-ray diffraction pattern of Table 1 is representative of "as-synthesized" or "as-made" SSZ-56 molecular sieves. Minor variations in the diffraction pattern can result from variations in the silica-to-boron mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-56 are shown in Table 2. Calcination can also result in changes in the intensities of the peaks as compared to patterns of the "as-made" material, as well as minor shifts in the diffraction pattern. The molecular sieve produced by exchanging the metal or other cations present in the molecular sieve with various other cations (such as H$^+$ or NH$_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-56 can be used as-synthesized, but preferably will be thermally treated (calcined). Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica to alumina mole ratio. The molecular sieve can also be steamed; steaming helps stabilize the crystalline lattice to attack from acids.

The molecular sieve can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired.

Metals may also be introduced into the molecular sieve by replacing some of the cations in the molecular sieve with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-56. The SSZ-56 can also be impregnated with the metals, or the metals can be physically and intimately admixed with the SSZ-56 using standard methods known to the art.

Typical ion-exchange techniques involve contacting the synthetic molecular sieve with a solution containing a salt of the desired replacing cation or cations. Although a wide variety of salts can be employed, chlorides and other halides, acetates, nitrates, and sulfates are particularly preferred. The molecular sieve is usually calcined prior to the ion-exchange procedure to remove the organic matter present in the channels and on the surface, since this results in a more effective ion exchange. Representative ion exchange techniques are disclosed in a wide variety of patents including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the molecular sieve is typically washed with water and dried at temperatures ranging from 65° C. to about 200° C. After washing, the molecular sieve can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-56, the spatial arrangement of the atoms which form the basic crystal lattice of the molecular sieve remains essentially unchanged.

SSZ-56 can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the SSZ-56 can be extruded before drying, or, dried or partially dried and then extruded.

SSZ-56 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

SSZ-56 may be used for the catalytic reduction of the oxides of nitrogen in a gas stream. Typically, the gas stream also contains oxygen, often a stoichiometric excess thereof. Also, the SSZ-56 may contain a metal or metal ions within or on it which are capable of catalyzing the reduction of the nitrogen oxides. Examples of such metals or metal ions include cobalt, copper, platinum, iron, chromium, manganese, nickel, zinc, lanthanum, palladium, rhodium and mixtures thereof.

One example of such a process for the catalytic reduction of oxides of nitrogen in the presence of a zeolite is disclosed in U.S. Pat. No. 4,297,328, issued Oct. 27, 1981 to Ritscher et al., which is incorporated by reference herein. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

EXAMPLES

The following examples demonstrate but do not limit the present invention.

Example 1

Synthesis of the directing agent
N,N-Diethyl-2-Methyldecahydroquinolinium
Hydroxide The parent amine 2-Methyldecahydroquinoline was obtained by hydrogenation of 2-methylquinoline (quinaldine) as described below. A 1000-ml stainless steel hydrogenation vessel was charged with 200 gm (1.4 mol) of 2-methylquinoline (quinaldine), purchased from Aldrich Chemical Company, and 300 ml glacial acetic acid, 10 gm of PtO$_2$ and 15 ml concentrated H$_2$SO$_4$. The mixture was purged twice with nitrogen (the vessel was pressurized with nitrogen to 1000 psi and evacuated). Then, the reaction vessel was pressurized to 1500-psi of hydrogen gas and allowed to stir at 50° C. overnight. The pressure dropped overnight and the vessel was pressurized back to 1500 psi (with H$_2$ gas) and let to stir until no further drop in the pressure was observed. Once the reaction was complete, the mixture was filtered and the filtrate was treated with 50 wt % aqueous sodium hydroxide solution until a pH of ~9 was achieved. The treated filtrate was diluted with 1000 ml diethyl ether. The organic layer was separated, washed with water and brine, and dried over anhydrous $MgSO_4$. Concentration under vacuum (using rotary evaporator) gave the amine as a pair of isomers (cis-fused and trans-fused ring system with the methyl group in the equatorial position in both isomers) in 97% yield (208 gm) in a ratio of 1.1:0.9 trans-fused:cis-fused. The authenticity of the product was established by spectral data analysis including NMR, IR and GCMS spectroscopy. In principle, there are four likely isomers, but only two isomers were produced.

N-Ethyl-2-methyldecahydroquinolinium hydroiodide was prepared according to the method described below. To a solution 100 gm (0.65 mol) of 2-methyldecahydroquinoline (trans and cis) in 350 ml acetonitrile, 111 gm (0.72 mole) of ethyl iodide was added. The mixture was stirred (using an overhead stirrer) at room temperature for 96 hours. Then, an additional ½ mole equivalent of ethyl iodide was added and the mixture was heated at reflux for 6 hours. The reaction mixture was concentrated on a rotary evaporator at reduced pressure and the obtained solids were rinsed with 500 ml ethyl ether to remove any unreactive amines and excess iodide. The reaction afforded a mixture of two N-ethyl-2-methyl-decahydroquinolinium hydroiodide salts (mono-ethyl derivatives) and a small mixture of the quaternized derivatives. The products were isolated by recrystallization from isopropyl alcohol several times to give the pure trans-fused ring N-ethyl-2-methyl-decahydroquinolinium hydroiodide and the pure cis-fused ring N-ethyl-2-methyl-decahydroquinolinium hydroiodide (see the scheme below).

N,N-Diethyl-2-methyldecahydroquinolinium iodide was prepared according to the procedure shown below. The procedure below is typical for making the N,N-diethyl-2-methyl-decahydro-quinolinium iodide. The obtained trans-fused ring N-ethyl-2-methyl-decahydroquinolinium hydroiodide (28 gm, 0.09 mol) was added to an acetonitrile (150 ml) and $KHCO_3$ (14 gm, 0.14 mol) solution. To this solution, 30 gm (0.19 mol) of ethyl iodide was added and the resulting mixture was stirred (with an overhead stirrer) at room temperature for 72 hours. Then, one more mole equivalent of ethyl iodide was added and the reaction was heated to reflux and allowed to stir at the reflux temperature for 6 hours. Heating was stopped and the reaction was allowed to further stir at room temperature overnight. The reaction was worked up by removing the excess ethyl iodide and the solvent at reduced pressure on a rotary evaporator. The resulting solids were suspended in 500 ml chloroform, which dissolves the desired product and leaves behind the unwanted $KHCO_3$ and its salt by-products. The solution was filtered, and the filtrate was dried over anhydrous $MgSO_4$. Filtration followed by concentration at reduced pressure on a rotary evaporator, gave the desired N,N-diethyl-2-methyl-decahydroquinolinium iodide as a pale tan-colored solid. The solid was further purified by recrystallization in isopropyl alcohol. The reaction afforded 26.8 gm (87% yield). The N,N-diethyl-2-methyl-decahydro-quinolinium iodide of the cis-fused ring isomer was made according to the procedure described above. The trans-fused ring derivative A (see the scheme 1 below) is the templating agent (SDA) useful for making SSZ-56.

N,N-Diethyl-2-methyldecahydroquinolinium hydroxide

The hydroxide version of N,N-diethyl-2-methyldecahydroquinolinium cation was prepared by ion exchange as described in the procedure below. To a solution of 20 gm (0.06 mol) of N,N-diethyl-2-methyldecahydroquinolinium iodide in 80 ml water, 80 gm of OH-ion exchange resin (BIO RAD® AGI-X8) was added, and the resulting mixture was allowed to gently stir at room temperature for few hours. The mixture was filtered and the ion exchange resin was rinsed with additional 30 ml water (to ensure removing all the cations from the resin). The rinse and the original filtrate were combined and titration analysis on a small sample of the filtrate with 0.1N HCl indicated a 0.5M OH ions concentration (0.055 mol cations). Scheme 1 below depicts the synthesis of the templating agent.

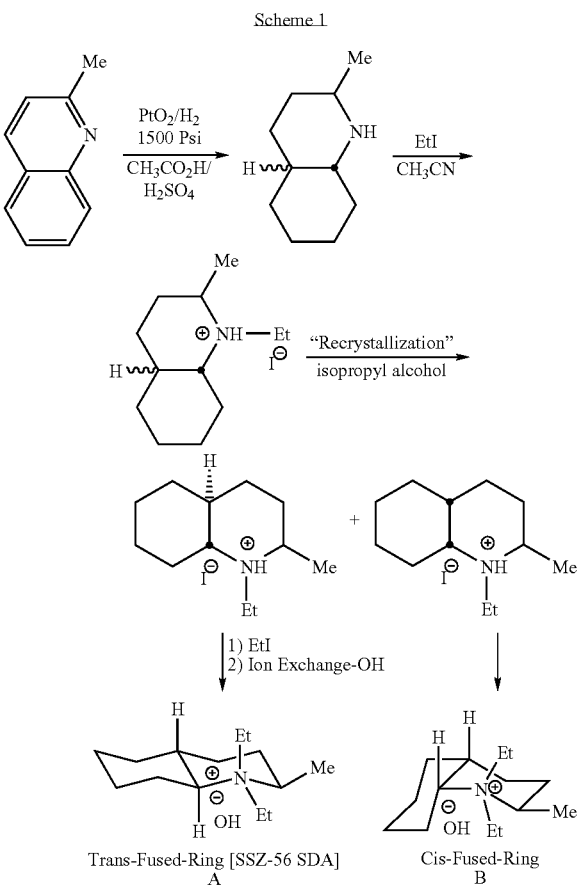

Scheme 1

Trans-Fused-Ring [SSZ-56 SDA]
A

Cis-Fused-Ring
B

There are 4 possible isomers (depicted below) from the synthesis, but only two isomers were produced: trans-fused-equatorial methyl A and cis-fused-equatorial methyl B.

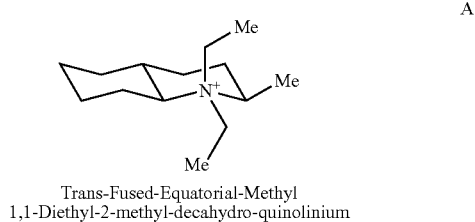

A

Trans-Fused-Equatorial-Methyl
1,1-Diethyl-2-methyl-decahydro-quinolinium

-continued

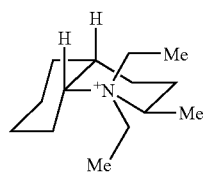

Cis-Fused-Equatorial-Methyl
1,1-Diethyl-2-methyl-decahydro-quinolinium

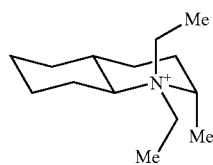

Trans-Fused-Axial-Methyl
1,1-Diethyl-2-methyl-decahydro-quinolinium

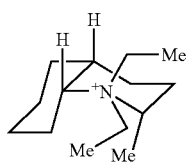

Cis-Fused-Axial-Methyl
1,1-Diethyl-2-methyl-decahydro-quinolinium

Example 2

Synthesis of Borosilicate SSZ-56 from Calcined Boron-BETA Zeolite

In a 23 cc Teflon liner, 3 gm of 0.5M solution (1.5 mmol) of N,N-diethyl-2-methyldecahydroquinolinium hydroxide (the trans-fused ring isomer), 0.5 gm of 1.0N solution of aqueous NaOH (0.5 mmol), 4.5 gm of de-ionized water, and 0.65 gm of calcined boron-BETA zeolite were all mixed. The Teflon liner was capped and placed in a Parr reactor and heated in an oven at 150° C. while tumbling at about 43 rpm. The reaction progress was checked by monitoring the gel's pH and by looking for crystal formation using Scanning Electron Microscopy (SEM) at 3–6 days intervals. The reaction was usually completed after heating for 18–24 days (shorter crystallization periods were achieved at 160° C.). The final pH at the end of the reaction ranged from 10.8–11.6. Once the crystallization was completed (by SEM analysis), the reaction mixture (usually a white fine powdery precipitate with clear liquid) was filtered. The collected solids were rinsed a few times with de-ionized water (~1000 ml), and then let to air-dry overnight followed by drying in an oven at 120° C. for 15–20 minutes. The reaction yielded about 0.55–0.6 gm of pure boron-SSZ-56 as determined by XRD analysis.

Example 3

Seeded Preparation of Borosilicate SSZ-56

In a 23 cc Teflon liner, 3 gm of 0.5M solution (1.5 mmol) of N,N-diethyl-2-methyldecahydroquinolinium hydroxide (the trans-fused ring isomer), 0.5 gm of 1.0N solution of aqueous NaOH (0.5 mmol), 4.5 gm of de-ionized water, 0.65 gm of calcined boron-BETA zeolite and 0.03 gm of SSZ-56 (made as described above) were mixed. The Teflon liner was capped and placed in a Parr reactor and heated in an oven at 150° C. while tumbling at about 43 rpm. The reaction progress was checked by monitoring the gel's pH and by looking for crystal formation using Scanning Electron Microscopy (SEM) at 3 day intervals. The crystallization was complete (SEM analysis) after heating for 6 days. The final pH at the end of the reaction was usually 11.2. Once completed, the reaction mixture was filtered, and the collected solids were rinsed with de-ionized water (~1000 ml), and then let to air-dry overnight followed by drying in an oven at 120° C. for 15–20 minutes. The reaction yielded 0.6 gm of pure boron-SSZ-56. Identity and characterization of the material was determined by XRD analysis.

Example 4

Direct Synthesis of Borosilicate SSZ-56 from Sodium Borate Decahydrate as the Boron Sources and CAB-O-SIL M-5 as the Silicon Source In a 23 cc Teflon liner, 6 gm of 0.5M solution (3 mmol) of N,N-diethyl-2-methyldecahydroquinolinium hydroxide (the trans-fused ring isomer), 1.2 gm of 1.0N solution of aqueous NaOH (1.2 mmol), 4.8 gm of de-ionized water, and 0.065 gm of sodium borate decahydrate were mixed and stirred until the sodium borate was completely dissolved. Then, 0.9 gm of Cab-O-Sil M-5 (~98% SiO2) was added and thoroughly mixed. The resulting gel was capped and placed in a Parr reactor and heated in an oven at 160° C. while tumbling at about 43 rpm. The reaction progress was checked by monitoring the gel's pH and by looking for crystal formation using Scanning Electron Microscopy (SEM) at 6 days intervals. The reaction was usually completed after heating for 18–24 days. The final pH at the end of the reaction ranged from 11.5–12.3. Once the crystallization was completed (by SEM analysis), the reaction mixture, a white fine powdery precipitate with clear liquid, was filtered. The collected solids were rinsed few times with de-ionized water (~1000 ml), and then air-dried overnight followed by drying in an oven at 120° C. for 15 minutes. The reaction usually yields about 0.75–0.9 gm of pure boron-SSZ-56.

Example 5

Seeded Synthesis of Borosilicate SSZ-56 from Sodium Borate Decahydrate as the Boron Source and CAB-O-SIL M-5 as the Silicon Source In a 23 cc Teflon liner, 6 gm of 0.5M solution (3 mmol) of N,N-diethyl-2-methyldecahydroquinolinium hydroxide (the trans-fused ring isomer), 1.2 gm of 1.0N solution of aqueous NaOH (1.2 mmol), 4.8 gm of de-ionized water, and 0.062 gm of sodium borate decahydrate were mixed and stirred until the sodium borate was completely dissolved. Then, 0.9 gm of Cab-O-Sil M-5 (~98% SiO2) and 0.04 gm of B-SSZ-56 made as in Example 4 were added and thoroughly mixed. The resulting gel was capped and placed in a Parr reactor and heated in an oven at 160° C. while tumbling at about 43 rpm. The reaction progress was checked by monitoring the gel's pH and by looking for crystal formation using Scanning Electron Microscopy (SEM) at 3–5 days intervals. The reaction was completed after heating for 7 days. The final pH at the end of the reaction was about 12.2. Once the crystallization was completed (by SEM analysis), the reaction mixture, a white fine powdery precipitate with clear liquid, was filtered. The collected solids were rinsed few times with de-ionized water (~1000 ml), and then air-dried overnight followed by drying in an oven at 120° C. for 15 minutes. The reaction yielded 0.88 gm of pure boron-SSZ-56.

Example 6

Calcination of SSZ-56

Removing the templating agent molecules (structure-directing agents: SDAs) from zeolite SSZ-56 to free its channels and cavities was accomplished by the calcination method described below. A sample of the as-made SSZ-56 synthesized according to the procedures of Examples 2, 3, 4 or 5 discussed above is calcined by preparing a thin bed of SSZ-56 in a calcination dish which was heated in a muffle furnace from room temperature to 595° C. in three stages. The sample was heated to 120° C. at a rate of 1° C./minute and held for 2 hours. Then, the temperature was ramped up to 540° C. at a rate of 1° C./minute and held for 5 hours. The temperature was then ramped up again at 1° C./minute to 595° C. and held there for 5 hours. A nitrogen stream with a slight bleed of air was passed over the zeolite at a rate of 20 standard cubic feet (0.57 standard cubic meters) per minute during heating the calcination process.

Example 7

Ammonium-Ion Exchange of SSZ-56

The $Na^+$ form of SSZ-56 prepared as in Examples 2, 3, 4 or 5 and calcined as in Example 6 was converted to $NH_4^+$-SSZ-56 form by heating the material in an aqueous solution of $NH_4NO_3$ (typically 1 gm $NH_4NO_3$/1 gm SSZ-56 in 20 ml $H_2O$) at 90° C. for 2–3 hours. The mixture was then filtered and the step was repeated as many times as desired (usually done 2–3 times). After filtration, the obtained $NH_4$-exchanged-product was washed with de-ionized water and air dried. The $NH_4^+$ form of SSZ-56 can be converted to the $H^+$ form by calcination to 540° C. (as described in Example 6 above stopping at the end of the second stage).

Example 8

Preparation of Aluminosilicate SSZ-56 by Aluminum Exchange of Boron-SSZ-56

The aluminosilicate version of SSZ-56 was prepared by way of exchanging borosilicate SSZ-56 with aluminum nitrate according to the procedure described below. The $H^+$ version of calcined borosilicate SSZ-56 (prepared as in Examples 2, 3, 4 or 5 and treated with ammonium nitrate and calcined as Example 6) was easily converted to the aluminosilicate SSZ-56 by suspending the zeolite ($H^+$/borosilicate SSZ-56) in 1M solution of aluminum nitrate nonahydrate (10 ml of 1M $Al(NO_3)_3 \cdot 9H_2O$ soln./1 gm SSZ-56). The suspension was heated at reflux overnight. The resulting mixture was then filtered and the collected solids were thoroughly rinsed with de-ionized water and air-dried overnight. The solids were further dried in an oven at 120° C. for 2 hours. The exchange can also be done on the $Na^+$ version of SSZ-56 (as prepared in Examples 2, 3, 4 or 5 and calcined as in Example 6).

Example 9

Nitrogen Adsorption (MicroPore Volume Analysis)

The $Na^+$ and $H^+$ forms of SSZ-56 as synthesized in Examples 2 and 4 above and treated as in Examples 6 and 7 was subjected to a surface area and micropore volume analysis using $N_2$ as adsorbate and via the BET method. The zeolite exhibited a considerable void volume with a micropore volume of 0.18 cc/g for $Na^+$ form, and 0.19 cc/gm for the $H^+$ form.

Example 10

Argon Adsorption (MicroPore Volume Analysis)

A calcined sample of $Na^+$ version of borosilicate SSZ-56 (synthesized as in Example 2 and calcined as in Example 6) had a micropore volume of 0.16 cc/gm based on argon adsorption isotherm at 87.5° K (−186° C.) recorded on ASAP 2010 equipment from Micromerities. The sample was first degassed at 400° C. for 16 hours prior to argon adsorption. The low-pressure dose was 2.00 cm3/g (STP). A maximum of one hour equilibration time per dose was used and the total run time was 37 hours. The argon adsorption isotherm was analyzed using the density function theory (DFT) formalism and parameters developed for activated carbon slits by Olivier (Porous Mater. 1995, 2, 9) using the Saito Foley adaptation of the Horvarth-Kawazoe formalism (Microporous Materials, 1995, 3, 531) and the conventional t-plot method (J. Catalysis, 1965, 4, 319).

Example 11

Constraint Index Test

The hydrogen form of SSZ-56 synthesized as in Example 2 was calcined and ammonium exchanged as in Examples 6 and 7 was aluminum exchanged as in Example 8. The obtained aluminum-exchanged sample of SSZ-56 was then ammonium exchanged as in Example 7 followed by calcination to 540° C. as in Example 6. The H-Al-SSZ-56 was pelletized at 4 KPSI, crushed and granulated to 20–40 mesh. A 0.6 gram sample of the granulated material was calcined in air at 540° C. for 4 hours and cooled in a desiccator to ensure dryness. Then, 0.5 gram was packed into a ⅜ inch stainless steel tube with alundum on both sides of the molecular sieve bed. A Lindburg furnace was used to heat the reactor tube. Helium was introduced into the reactor tube at 10 cc/min. and at atmospheric pressure. The reactor was heated to about 315° C., and a 50/50 feed of n-hexane and 3-methylpentane is introduced into the reactor at a rate of 8 µl/min. The feed was delivered by a Brownlee pump. Direct sampling into a GC began after 10 minutes of feed introduction. The Constraint Index (CI) value was calculated from the GC data using methods known in the art. SSZ-56 had a CI of 0.76 and a conversion of 79% after 15 minutes on stream. The material fouled rapidly and at 105 minutes the CI was 0.35 and the conversion was 25.2%. The CI test showed the material was very active catalytic material.

Example 12 n-Hexadecane Hydrocracking Test

A 1 gm sample of SSZ-56 (prepared as described for the Constraint Index test in Example 11) was suspended in 10 gm de-ionized water. To this suspension, a solution of Pd(NH$_3$)$_4$(NO$_3$)$_2$ at a concentration which would provide 0.5 wt. % Pd with respect to the dry weight of the molecular sieve sample was added. The pH of the solution was adjusted to pH of 9.2 by a drop-wise addition of 0.15N solution of ammonium hydroxide. The mixture was then heated in an oven at 75° C. for 48 hours. The mixture was then filtered through a glass frit, washed with de-ionized water, and air-dried. The collected Pd-SSZ-56 sample was slowly calcined up to 482° C. in air and held there for three hours.

The calcined Pd/ISSZ-56 catalyst was pelletized in a Carver Press and granulated to yield particles with a 20/40 mesh size. Sized catalyst (0.5 g) was packed into a ¼ inch OD tubing reactor in a micro unit for n-hexadecane hydroconversion. The table below gives the run conditions and the products data for the hydrocracking test on n-hexadecane.

As the results show in the table below, SSZ-56 is a very active and isomerisation selective catalyst at 96.5% n-C$_{16}$ conversion at 256° C.

| | |
|---|---|
| Temperature | 256° C. (496° F.) |
| Time-on-Stream (hrs.) | 71.4–72.9 |
| WHSV | 1.55 |
| PSIG | 1200 |
| Titrated? | NO |
| n-16, % Conversion | 96.5 |
| Hydrocracking Conv. | 35.2 |
| Isomerization Selectivity, % | 63.5 |
| Cracking Selectivity, % | 36.5 |
| C$_{4-}$ % | 2.3 |
| C$_5$/C$_4$ | 15.2 |
| C$_{5+}$C$_6$/C$_5$, % | 19.3 |
| DMB/MP | 0.05 |
| C$_4$–C$_{13}$ i/n | 3.7 |
| C$_7$–C$_{13}$ yield | 27.7 |

What is claimed is:

1. A process for the reduction of oxides of nitrogen contained in a gas stream wherein said process comprises contacting the gas stream with a molecular sieve, the molecular sieve having a mole ratio greater than about 15 of (1) an oxide of a first tetravalent element to (2) an oxide of a trivalent element, pentavalent element, second tetravalent element which is different from said first tetravalent element or mixture thereof and having, after calcination, the X-ray diffraction lines of Table 2.

2. The process of claim 1 conducted in the presence of oxygen.

3. The process of claim 1 wherein said molecular sieve contains a metal or metal ions capable of catalyzing the reduction of the oxides of nitrogen.

4. The process of claim 3 wherein the metal is cobalt, copper, platinum, iron, chromium, manganese, nickel, zinc, lanthanum, palladium, rhodium or mixtures thereof.

5. The process of claim 3 wherein the gas stream is the exhaust stream of an internal combustion engine.

6. The process of claim 1 wherein the gas stream is the exhaust stream of an internal combustion engine.

7. A process for the reduction of oxides of nitrogen contained in a gas stream wherein said process comprises contacting the gas stream with a molecular sieve, the molecular sieve having a mole ratio greater than about 15 of (1) silicon oxide to (2) an oxide selected from aluminum oxide, gallium oxide, iron oxide, boron oxide, titanium oxide, indium oxide and mixtures thereof, and having, after calcination, the X-ray diffraction lines of Table 2.

8. The process of claim 7 conducted in the presence of oxygen.

9. The process of claim 7 wherein said molecular sieve contains a metal or metal ions capable of catalyzing the reduction of the oxides of nitrogen.

10. The process of claim 9 wherein the metal is cobalt, copper, platinum, iron, chromium, manganese, nickel, zinc, lanthanum, palladium, rhodium or mixtures thereof.

11. The process of claim 9 wherein the gas stream is the exhaust stream of an internal combustion engine.

12. The process of claim 7 wherein the gas stream is the exhaust stream of an internal combustion engine.

* * * * *